United States Patent [19]

Uraneck et al.

[11] 4,072,807

[45] Feb. 7, 1978

[54] MOLECULAR WEIGHT REDUCTION OF UNSATURATED POLYMERS

[75] Inventors: Carl A. Uraneck; James D. Brown, both of Bartlesville, Okla.

[73] Assignee: Phillips Petroleum Company, Bartlesville, Okla.

[21] Appl. No.: 600,551

[22] Filed: July 31, 1975

Related U.S. Application Data

[60] Division of Ser. No. 352,741, April 19, 1973, Pat. No. 3,917,576, which is a continuation of Ser. No. 72,241, Sept. 14, 1970, abandoned.

[51] Int. Cl.² .......................... C08C 19/26; C08F 8/42

[52] U.S. Cl. ..................................... 526/48.1; 526/30; 526/41; 526/46; 526/914

[58] Field of Search .......................................... 526/48

[56] References Cited

U.S. PATENT DOCUMENTS 3,558,589   1/1971   Bethea et al. .................. 260/94.7 D

FOREIGN PATENT DOCUMENTS 1,108,586   3/1968   United Kingdom.

*Primary Examiner*—Paul R. Michl

[57] ABSTRACT

Polymers containing internal unsaturation are modified by treatment with an olefin disproportionation catalyst.

38 Claims, No Drawings

MOLECULAR WEIGHT REDUCTION OF UNSATURATED POLYMERS

This is a Divisional application of U.S. Ser. No. 352,741, filed Apr. 19, 1973, now U.S. Pat. No. 3,917,576, patented Nov. 4, 1975, which was a Continuation Application of U.S. Ser. No. 72,241, filed Sep. 14, 1970, now abandoned.

FIELD OF THE INVENTION

This invention relates to the modification of unsaturated polymers.

DESCRIPTION OF THE PRIOR ART

Recent developments in the polymerization of unsaturated compounds to provide high molecular weight polymers has resulted in a unique problem. Many times, the catalysts which effect the polymerization of diolefins to high Mooney viscosity rubbers or resinous diene polymers can result in a polymer which has a molecular weight which is so high that the polymer is unsuitable for various conventional elastomeric applications. Accordingly, the art has felt a need for a method to reduce the molecular weight of these polymers in order to render them processable in various conventional applications. Furthermore, the polymerization art has had difficulty in economically preparing low molecular weight polymers of diolefins for use as plasticizers or adhesives.

OBJECTS OF THE INVENTION

It is an object of this invention to provide a method of reducing the molecular weight of high molecular weight polymers. Other objects and advantages of the invention will be apparent to one skilled in the art from a study of the disclosure and claims.

SUMMARY OF THE INVENTION

We have discovered that high molecular weight polymers having internal unsaturation in the polymer carbon chain can be modified to produce lower molecular weight polymers by contacting the polymer with an olefin disproportionation catalyst. Accordingly, high Mooney viscosity rubbers of resinous polymers are rendered processable when treated according to the invention and relatively low molecular weight polymers are produced, the particular molecular weight and therefore the type of polymer produced being dependent upon the nature of the starting polymer and the conditions of treatment.

Further in accordance with the invention, we have discovered that unsaturated polymers of cyclic monoolefins, e.g., polymers of cyclopentene, can be converted to unsaturated polymers of lower molecular weight and to the cyclic monoolefin monomer, e.g., cyclopentene, by contacting the high molecular weight unsaturated polymer with an olefin disproportionation catalyst.

DETAILED DESCRIPTION OF THE INVENTION

The polymers which can be treated in accordance with the invention include any polymer containing a backbone of carbon atoms and having internal unsaturation. Preferably, the polymers are prepared from conjugated diene monomers. However, unsaturated polymers of cyclic monoolefins such as cyclopentane, are equally suited for the process of the invention. Such polymers generally contain one double bond for each monomer unit incorporated in said polymers.

The initial molecular weight of the polymer treated in accordance with the invention is in the range of from about 1,000 to about 10,000,000. Preferably, the molecular weight is in the range of from about 10,000 to 500,000. The term "molecular weight" as used throughout this specification and the claims refers to weight-average molecular weight. For the purpose of clarity in defining the invention and as applied to the claims, the weight-average molecular weight is determined by light scattering, as reported in "Encyclopedia of Polymer Science and Technology", Vol 8, pp. 231–233, John Wiley & Sons, Inc. (1968). As a practical matter, any method presently known in the art or hereinafter developed can be used to determine molecular weight and to observe the resulting modification of the molecular weight as a result of treatment in accordance with the invention. For example, it is convenient to determine the inherent viscosity of the polymer before and after treatment to observe the relative molecular weight change.

Any polymer which is capable of modification in molecular weight when treated in accordance with the invention can be employed. It is believed that the polymer must have sufficient internal unsaturation to undergo the modification of the molecular weight. In theory, an average of at least one double bond in the carbon backbone per polymer molecule is necessary. As a practical matter, those polymers containing an average of from about 0.25 to 1 internal double bond per monomer unit are preferred. The terms "internal double bond" and "double bond in the carbon backbone" excludes vinyl unsaturation. However, of course, it is understood that the polymer treated in accordance with the invention can also have vinyl unsaturation. These internally unsaturated polymers employed in the invention can be defined using more descriptive terms, i.e., liquid, elastomeric and resinous polymers. The elastomeric and resinous polymers are the more preferred.

The polymer unsaturation can be determined by two separate techniques, iodine monochloride titration and infrared analyses. Where appropriate, a combination of these techniques can be used. ICl titration is an art recognized general method for determining the level of carbon-carbon unsaturation in a wide variety of polymers. Results are expressed in terms of mmoles of ICl reacted with one gram of polymer. Thus, when one prepares a polymer containing from 0.25–1 double bonds per monomer unit, one can calculate the average number of carbon-carbon double bonds per molecule if the average molecular weight is known. For the purpose of determining the extent of unsaturation in the polymer, the weight-average molecular weight value employed is the one as determined by the above-described light scattering technique. The ICl titration procedure measures total unsaturation, e.g., it does not distinguish between "internal" and "vinyl" unsaturation. However, even when the polymer has less than 0.25–1 double bonds per monomer unit, if the polymer undergoes modification of the molecular weight when treated according to the process of the invention, then inherently the polymer contains sufficient internal unsaturation.

The second method which can be employed to determine unsaturation is the art recognized procedure of infrared analyses. This method has particular utility for the preferred class of polymers treated according to the invention, i.e., homopolymers and copolymers of conjugated dienes. Infrared analysis is useful for determining the amount of 1,4-addition (internal unsaturation) in these polymers. Other known methods are also available for determining vinyl unsaturation.

The preferred diene polymers which can be treated in accordance with the process of the invention are homopolymers of conjugated dienes containing 4-12 carbon atoms per molecule, copolymers of 2 of more such dienes, and copolymers of such dienes with vinyl monomers. The diene homopolymers and copolymers, as well as the copolymers of dienes with vinyl monomers wherein the diene portion originates from a conjugated monomer are preferred. Unsaturated polymers of cyclic monoolefins which are suitable for treatment in accordance with the invention include those polymers prepared from unsubstituted cyclic monoolefins having 5 and 7-10 carbon atoms per molecule.

The copolymers of 2 or more dienes and copolymers of the diene with vinyl monomers, contain at least 5 parts by weight of the diene per 100 parts by weight of the copolymer. Mixtures of diene homopolymers, mixtures of copolymers, or mixtures of homopolymers and copolymers can be employed in the process of the invention. In either case, the mixtures of diene homopolymers, the mixtures of diene copolymers, or mixtures of diene homopolymers and diene copolymers advantageously have a molecular weight of at least about 1000. Homopolymers of conjugated dienes containing from 4-12 carbon atoms per molecule can be prepared by any means known in the art. A suitable method for the preparation of the homopolymers is disclosed in U.S. Pat. No. 3,278,508, issued Oct. 11, 1966. Exemplary homopolymers which can be employed in the process of the invention are homopolymers of:

1,3-butadiene
isoprene
2,3-dimethyl-1,3-butadiene
1,3-pentadiene (piperylene)
2-methyl-3-ethyl-1,3-butadiene
3-methyl-1,3-pentadiene
2-methyl-3-ethyl-1,3-pentadiene
2-ethyl-1,3-pentadiene
1,3-hexadiene
3-methyl-1,3-heptadiene
1,3-octadiene
3-butyl-1,3-octadiene
3,4-dimethyl-1,3-hexadiene
3-n-propyl-1,3-pentadiene
4,5-diethyl-1,3-octadiene
2-phenyl-1,3-butadiene
2,3-diethyl-1,3-butadiene
2,3-di-n-propyl-1,3-butadiene
2-methyl-3-isopropyl-1,3-butadiene
and the like.

Conjugated dienes containing halogen and alkoxy substituents along the chain can also be employed such as chloroprene, fluoroprene, 2-methoxy-1,3-butadiene, 2-ethoxy-3-ethyl-1,3-butadiene, and 2-ethoxy-3-methyl-1,3-hexadiene.

Copolymers of conjugated dienes containing from 4-12 carbon atoms per molecule with other vinyl monomers copolymerizable therewith can be prepared by any means known in the art. Exemplary compounds which can be used to form copolymers of conjugated dienes with the vinyl monomers in the invention include:

aryl-substituted olefins, such as styrene, various alkyl styrenes, p-methoxystyrene, vinylnaphthalene, and the like;

heterocyclic nitrogen-containing monomers, such as pyridine and quinoline derivatives containing at least 1 vinyl or alphamethyl-vinyl group, such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.;

similar mono- and di-substituted alkenyl pyridines and like quinolines;

acrylic acid esters, such as methyl acrylate, ethyl acrylate;

alkacrylic acid esters, such as methyl methacrylate, ethyl methacrylate, propyl methacrylate, ethyl ethacrylate, butyl methacrylate;

methyl vinyl ether, vinyl chloride, vinylidene chloride, vinylfuran, vinylcarbazole, vinylacetylene, etc.

In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

Suitable unsaturated polymers of cyclic olefins which can be modified in accordance with the invention include polymers prepared from cyclopentene, cycloheptene, cyclooctene, cyclononene, and cyclodecene.

The modification of the above-described polymers is accomplished by the use of a catalyst known in the art as an olefin disproportionation catalyst. These catalysts have heretofore been employed to convert olefinic materials into other olefinic materials wherein the reaction can be visualized as the reaction between two first pairs of carbon atoms, the two carbon atoms of each first pair being connected by a double bond, to form two new pairs from the carbon atoms of the first pairs, the carbon atoms of each new pairs being connected by a double bond. Although not completely understood, it is believed the disproportionation reaction occurs via a saturated transition state intermediate. Thus, the reaction can be illustrated by the following formula:

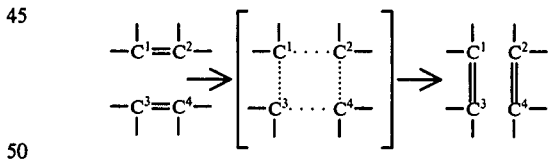

Other terms have been employed in the art to describe the olefin disproportionation reaction and the catalysts which effect this reaction. They include such terms as "olefin reaction", "olefin dismutation", "transalkylidenation", and "olefin metathesis".

Catalysts having activity for converting olefins in accordance with the above-described olefin disproportionation reaction which can be employed to modify the high molecular weight unsaturated polymers are homogeneous catalysts, which are generally employed in the presence of a liquid diluent during the reaction.

Generally, the preferred temperature, pressure, and time for the modification reaction will be substantially the same as the optimum conditions at which the olefin disproportionation catalyst will convert lower molecular weight acyclic olefins such as propylene, butenes, and pentenes. Where the optimum temperature for the olefin disproportionation reaction is higher than about 250° F, the polymer is preferably treated in a solution of an inert diluent for a short period of time in the liquid phase. This technique is designed to minimize degradation of the polymer due to thermal degradation. Excessively high reaction temperatures at which the polymers tend to decompose are to be avoided.

The homogeneous catalysts which are particularly suited for the modification reaction comprise (a) a transition metal compound in admixture with (b) an organometallic compound. The (a) components of the homogeneous olefin disproportionation catalysts which can be employed in the present invention can be represented by the formula $[(L)_a M_c Z_d]_x$ wherein each (L) are organic or inorganic ligands; M is a transition metal of Group IB, IIIB, IVB, VB, VIB, VIIB, the iron and cobalt subgroups of Group VIII; Z is a halide or a radical such as CN, SCN, OCN, and $SnCl_3$; $a$ and $d$ are numbers 0–6, $c$ is 1–4; $x$ is a number indicative of the polymeric state of the compound; generally 1–3 or higher; at least one of (L) or Z is present; and wherein the number of (L) and Z groups present in the component (a) compound shall not be greater than the number required for the metal to achieve the closed shell electronic configuration of the next higher atomic number inert gas. Preferred (L) ligands are $R_3Q$, $R_3QO$, $R_2Q-QR_2$, $R_2NR^1$, O, S, CO, $R_2N-R^2-NR_2$, R—S—R, $R^3S$, $[\pi-(CHR^4=CR^4=CH_2)]$, $R^5(CN)_k$, $R^5O-$, $R^5(COO-)_k$, $RCOR^6(COO-)_k$, $[(RCO)_2CH-]$, $(R_2NCSS-)$, unsubstituted and $R^5$ group-substituted pyridine, unsubstituted and $R^5$ group-substituted bipyridine, or unsubstituted and R group-substituted cyclopentadienyl radicals wherein in the above formulas R is an aromatic or saturated aliphatic radical, including radicals substituted with groups such as halo groups or alkoxy groups and the like, having up to 20 carbon atoms; $R^1$ is hydrogen or an R radical; $R^2$ is a divalent R radical; $R^3$ is a divalent saturated aliphatic or ethylenically unsaturated aliphatic carbon having from 4 to 10 carbom atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1–2.

The preferred component (a) compounds are complex compounds of the metals of Groups VIB, VIIB, and the iron and cobalt subgroups of Group VIII. The more preferred metals of these are molybdenum, tungsten, rhenium, ruthenium, or rhodium. Those (a) components which contain $(L)_a$ and $Z_d$ groups wherein a is 1–5 and/or $d$ is 1–5 are generally preferred. The most preferred $(L)_a$ group is the $R^5(COO-)_k$ radical.

Suitable examples of the preferred $R^5(COO-)M_cZ_d$ compounds include molybdenum trichloride distearate, molybdenum trichloride dioctanoate, molybdenum trichloride dilaurate, molybdenum trichloride dioleate, molybdenum trichloride dibenzoate, molybdenum trichloride glutarate, molybdenum trichloride ditriacontanoate, molybdenum trichloride di(4-cyclododecenoate), tungsten tetrachloride distearate, tungsten diiodide tetralaurate, and the like. The most preferred metal compounds are those of molybdenum, such as molybdenum trichloride distearate and molybdenum trichloride dioctanoate.

The formula $[(L)_a M_c Z_d]_x$ is used herein to identify the product obtained by the admixture, under catalyst forming conditions, of the metal compound with one or more ligand-forming materials whether or not the components are present in the complex as indicated in the formula.

The transition metal compounds which are applicable for use as the (a) component of the catalyst system of the present invention are generally compounds which are available or which can be prepared by methods which are conventional in the art.

In many instances, the suitable (a) component need not be an isolated complex compound but can, for convenience and economy, simply be the admixture of a suitable, relatively simple, compound of a transition metal and one or more complexing agents. Thus, under complex-forming conditions, the admixture of these ingredients, complete with the diluent which is generally used to facilitate the mixing, can frequently be utilized without additional separation, isolation, or other treatment.

When it is desired to prepare and utilize transition metal complex compounds in the form of nonisolated admixtures of its components, a transition metal compound and one or more complexing agents are merely combined in proportions and under conditions of temperature and time which permit the catalytically active transition metal complex to be formed, generally in a diluent in which the components are at least partially soluble. Suitable transition metal starting compounds, for example, are halides, oxyhalides, carbonyls, carbonyl halides, or salts of inorganic or organic acids, preferably halides.

When the (a) component of the catalyst system is the product obtained by combining a compound of a transition metal, as hereinbefore discussed, with one or more suitable ligand-forming materials, these materials are simply combined under conditions of time and temperature which permit the complex to be formed. In general, excessively high temperatures at which the reagents tend to decompose, or excessively low temperatures, at which the reagents tend to crystallize or otherwise tend to become unreactive, should be avoided. The molar proportion of transition metal salt to the selected ligand-former can be in the range of from about 0.1:1 to about 10:1, preferably from about 0.2:1 to about 2:1. The products are obtained by combining these ingredients at a temperature preferably in the range of from about $-25°$ to about 130° C, more preferably 0° to about 60° C, for a time in the range of from a few seconds up to about 24 hours, preferably in the presence of a diluent in which the components of the admixture are at least partially soluble. Any convenient diluent such as carbon tetrachloride, methylene chloride, xylene, cyclohexane, isooctane, benzene, chlorobenzene, and the like, can be used for this purpose. Any order of addition can be used. Such product need not be isolated but the mixture can be used directly in the formation of the catalyst system.

In general, the (a) component of the catalyst system is fully prepared before contact is made with the (b) component. It is sometimes desirable to remove excess or unreacted complexing agent from the (a) component before contact is made with the (b) component. Such removal can often be conveniently carried out by warming the complex under reduced pressure to evaporate the unreacted complexing agent. Such removal of this excess reagent is not a necessity, but is frequently desirable, because the excess reagent appears to consume some of the (b) component which is added later.

For this reason, grossly excessive amounts of any of the complexing agents should be avoided.

The (b) component of the homogeneous catalyst is an organometallic adjuvant selected from: (1) $R_eAlX_f$, (2) a mixture of compounds of (1), (3) a mixture of one or more of $AlX_3$ or $R_eAlX_f$ compounds with one or more compounds having the formula $R_g^1M^1X_h$, (4) an $R_gM^1Y_h$ compound, (5) an $AlX_3$ compound, or (6) $M^1M^2H_j$ wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ is a metal of Group IA, IIA, IIB or IIIA, except Al, and each $M^2$ is a metal of Group IA, IIA, IIB or IIIA; $e$ is 1, 2, or 3, $f$ is 0, 1 or 2, the sum of $e$ and $f$ being 3; $g$ is 1, 2 or 3, $h$ is 0, 1 or 2, the sum of $g$ and $h$ being equal to the valence of $M^1$, $j$ is an integer such that it is equal to the sum of the valences of $M^1$ and $M^2$.

Some specific examples of $R_eAlX_f$ and $AlX_3$ compounds are: methylaluminum sesquichloride, methylaluminum dichloride, dimethylaluminum fluoride, ethylaluminum dichloride, aluminum trichloride, ethylaluminum sesquichloride, diethylaluminum chloride, di(3-ethoxypropyl)aluminum bromide, di(methoxymethyl)aluminum bromide, n-pentylaluminum dichloride, aluminum tribromide, di(2-ethylhexyl)aluminum bromide, phenylaluminum dichloride, benzylaluminum diiodide, di(4,4,4-trifluorobutyl)aluminum chloride, dieicosylaluminum bromide, and the like, and mixtures thereof.

Some specific examples of the $R_g^1M^1X_h$ and $R_gM^1Y_h$ compounds are: phenyllithium, benzylrubidium, methylsodium, t-butylpotassium, lithium hydride, anthrylcesium, ethylberyllium hydride, methylcadmium chloride, diethylzinc, diethylmagnesium, dicyclohexylmercury, methylgallium dibromide, dimethylbarium, triethylindium, triisopropylthallium, dimethylcalcium, dimethylmagnesium, dimethylstrontium, hexylzinc iodide, and the like, and mixtures thereof. Some specific examples of $M^1M^2H_j$ are: lithium aluminum hydride, lithium borohydride, or the like.

Presently preferred (b) adjuvant components of the catalytic system are those shown in (1) and (2), particularly adjuvants such as those represented by $R_3Al_2X_3$, and $RAlX_2$. Adjuvants such as methylaluminum sesquichloride, diethylaluminum chloride, and ethylaluminum dichloride are frequently favored because they generally provide increased catalytic activity.

The elements referred to herein are in accordance with the Periodic Table of Elements appearing in Handbook of Chemistry and Physics, Chemical Rubber Company, 45th edition (1964), page B-2.

The above-described (a) and (b) components of the catalyst system are combined, in suitable proportions as discussed below, at any convenient temperature within the range of −80° to about 100° C, preferable 0–60° C for a few seconds or for periods of up to several hours, in the presence of an inert diluent in which both the components are at least partially soluble, for example, chlorobenzene, methylene chloride, ethylene chloride, benzene, xylene, toluene, cyclohexane, and the like. The combination occurs very readily. Ordinarily, the mixing is carried out in an inert atmosphere free of air or moisture. After the catalytic mixture is formed, it need not be isolated, but can be added directly to the reaction zone as a solution or dispersion in its preparation solvent. If desired, the (a) and (b) components can be separately added, in any order, to the reaction zone either in the presence or absence of the polymeric reactant.

Some suitable examples of homogeneous catalysts which can be used for the modification of the high molecular weight polymers include molybdenum trichloride distearate with diethylaluminum chloride, ethylaluminum dichloride, methylaluminum sesquichloride, or ethylaluminum sesquichloride; bis(triphenylphosphine)molybdenum tetrachloride with methylaluminum sesquichloride; molybdenum hexacarbonyl or triphenylphosphine molybdenum pentacarbonyl with ethylaluminum dichloride; molybdenum trichloride dioctanoate with diethylaluminum chloride; tungsten tectrachloride distearate with diethylaluminum chloride; molybdenum trichloride dilaurate, molybdenum trichloride distearate, molybdenum oxychloride stearate or tungsten tetrachloride distearate with diethylmagnesium; bis(triphenylphosphine)rhenium oxytribromide, bis(triphenylphosphine)rhenium oxytrichloride, or bis(triphenylphosphine)rhenium tetrachloride with ethylaluminum dichloride; bis[tris($\pi$-allyl)-rhodium trichloride] with methylaluminum sesquichloride.

The process of the invention is carried out by simply contacting the unsaturated polymer with the selected olefin disproportionation catalyst. In using the preferred homogeneous catalysts, the mole ratio of the (b) component of the catalyst to the (a) component of the catalyst can be adjusted in order that the desired effect of modification of the polymer is achieved and is generally in the range of 0.1:1 to about 10:1, preferably in the range of from 0.1:1 to 3:1. More preferably, the ratio of (b) to (a) is in the range of 0.25:1 to about 2.5:1. The optimum mol ratio for a particular polymer will be dependent on the particular polymer undergoing the modification reaction and on other reaction parameters such as temperature. A unique effect of the treatment of the polymers in accordance with the invention is that at certain molar ratios of (b) to (a), the polymer will undergo long chain branching giving rise to an increase in inherent viscosity and a decrease in cold flow of the polymer. The particular mol ratio at which this occurs for a particular polymer is easily observed by one skilled in the art. When this phenomenon is observed, the mol ratio of (b) to (a) is decreased to the vicinity of 1:1 or less. For example, polyisoprene will decrease in molecular weight at levels of about 2.5:1 or less while polybutadiene will decrease in molecular weight at a level of about 1.5:1 or less. The amount of homogeneous catalyst employed is conveniently based on the amount of organometallic compound employed and is generally in the range of from about 0.15 to about 150 gram millimoles per 100 grams of polymer.

The homogeneous polymer modification catalysts can be deposited upon a suitable support or carrier and used in the modification reaction, preferably where a polymer is in solution. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, and the like.

The support can be impregnated with the homogeneous catalyst by wetting the support with a solution of the catalyst in a solvent which is then evaporated. The support can also be impregnated with either the (a) or (b) component and the remaining component can be added later. For example, the solid support material can be impregnated with the (a) component and the resulting composite conveniently stored until required. Just prior to use, the composite can be treated with the (b) component, or, if the reaction is in the liquid phase, the (b) component can simply be added to the reaction zone. Among solvents suitable are relatively low-boiling organic solvents such as pentane, methylene chloride, cyclohexane, and the like. The amount of homogeneous catalyst added to the support will be from 0.1 to about 30 weight per cent of the total of the catalyst and support. If the support is to be activated by calcination, it is usually activated prior to the impregnation step.

Impregnation and evaporation conditions in preparing the catalyst are conventional, being carried out at a temperature up to about 150° C. Operating conditions in carrying out the reaction are the same for the supported and the nonsupported homogeneous catalyst systems.

The treatment of the polymer in the presence of the olefin disproportionation catalyst systems mentioned above is generally and preferably effected in a solution of the polymer. When the polymer is prepared in solution in the presence of an organometallic catalyst system, the homogeneous catalyst can be used immediately after polymerization without inactivation of the polymerization catalyst by adding the olefin disproportionation catalyst to the polymerization reactor effluent. It is also within the scope of the invention to dissolve an inactive (i.e., terminated) polymer in a suitable diluent, e.g., hydrocarbon diluent such as is used for the polymerization of the polymer and subsequently contact the polymer solution with the homogeneous catalysts.

The temperature at which the polymers are contacted with the disproportionation catalysts mentioned above is generally in the range of 50°–250° F. The treating time is dependent upon the temperature and can range from 1 minute or less to 100 hours or more. For most purposes, the treating time is less than 25 hours and in many instances the desired results are obtained in less than 5 hours, depending upon the nature of the starting polymer (e.g., rubbery or resinous). Pressures employed are advantageously in the range of from 1–100 atmospheres, although atmospheric pressure is preferred.

The reduced molecular weight products have utility as elastomers, thermoplastic resins, very soft rubbers or plastics, or liquids of various types. As elastomers, the products can be vulcanized in conventional curing systems with or without added fillers and extender oils to produce tire tread or carcass stock, gaskets, hose, tubing, or molded rubber goods. As thermoplastics, the products can also be compounded with known stabilizers, fillers, plasticizers and the like to produce molded or extruded containers, tubing, film, machine parts, toys, and the like. The very soft products can be compounded in conventional recipes to produce sealants, coating compositions, calking compounds, putties, mastics, and the like. Liquid products can be employed as plasticizers for various polymers, as potting compounds in the electrical industry, and can be compounded with tackifiers, fillers, stabilizers, and the like for adhesive applications. The liquid products can also serve as intermediates in the manufacture of surface active agents, epoxy resin crosslinking agents and the like.

When a polymer of a conjugated diene is treated in accordance with the invention and the polymer modification reaction allowed to proceed for a sufficient length of time, the resulting product is a nonconjugated polyene which is often difficult to prepare by other methods. These nonconjugated polyenes can be employed as intermediates for the synthesis of various types of compounds and also as monomers. One use is as termonomers for the production of ethylene/propylene rubber. One unique advantage of the invention when polymers of cyclomonoolefins undergo treatment, is that the treatment regenerates cyclomonoolefin monomer. For example, when an unsaturated polymer of cyclopentene of high molecular weight is treated with a catalyst as described above, the reaction products are lower molecular weight polymer plus cyclopentene. Cyclopentene thus produced after suitable separation and purification can be used as additional monomer for subsequent polymerization or other desired reactions of cyclopentene using suitable methods known in the art.

The following examples are presented for the purpose of illustrating the above-described invention. However, the data included therein should not be construed to limit the spirit or scope of the invention.

EXAMPLE I

A polybutadiene was treated with a diethylaluminum chloride/molybdenum trichloride distearate catalyst according to this invention to demonstrate the modification of said polybutadiene. The polybutadiene employed in this series of runs was prepared according to the polymerization recipe shown below.

| Polymerization Recipe | |
|---|---|
| | Parts, by weight |
| Toluene | 860 |
| 1,3-Butadiene | 100 |
| n-Butyllithium | 0.90 mhm[a] |
| Temperature, °C | 70 |
| Time, hours | 1.67 |
| Conversion, % | 100 |
| Inherent viscosity[b] | 4.05 |
| Gel, % | 0 |
| Unsaturation, %[c] | 96.5 |

[a] mhm = gram millimoles per 100 grams of butadiene charged.
[b] Determined according to the procedure of U.S. 3,278,508, Col. 20, notes a & b.
[c] Determined according to the procedure of U.S. 3,299,016, Col. 9, lines 57 ff.

In this run toluene was charged to the reactor first followed by a nitrogen purge. Butadiene was added next followed by n-butyllithium and the mixture was then agitated at 70° C throughout the reaction period. The polymerization was terminated with isopropyl alcohol and the mixture coagulated with isopropyl alcohol. The polymer was then separated and dried.

The polybutadiene prepared as described above was treated according to this invention employing the recipe shown below. The results of these runs are shown in Table I.

TABLE I

| Run No. | Temp., °C | Ratio Al/Mo | Time, Hours | Inherent Viscosity | Gel % | Unsaturation, % | | |
|---|---|---|---|---|---|---|---|---|
| | | | | | | trans | Vinyl | total |
| 1[a] | 5 | 1.5/1 | 1.5 | 3.27 | 0 | — | — | — |
| 2[a] | 5 | 1.5/1 | 17.8 | 2.48 | 0 | — | — | — |
| 3[a] | 5 | 1.5/1 | 42.4 | 2.55 | 0 | 46.1 | 12.1 | 94.3 |

TABLE I-continued

| Run No. | Temp., °C | Ratio Al/Mo | Time, Hours | Inherent Viscosity | Gel % | Unsaturation. % trans | Vinyl | total |
|---|---|---|---|---|---|---|---|---|
| 4[a] | 5 / 70 | 1.5/1 | 24 / 0.75 | 1.08 | 0 | 45.5 | 11.6 | 95.1 |
| 5[b] | 5 | — | 2 | 4.05 | 0 | 46.1 | 11.3 | 96.5 |

[a] Catalyst preformed by mixing 3.45 ml. diethylaluminum chloride (0.25 M solution in cyclohexane), 2.60 ml. molybdenum trichloride distearate (0.256 M solution in cyclohexane) and 50 ml. toluene at 70° C for 10 minutes.
[b] Control run, i.e., no catalyst added to the polymer solution In these runs the polybutadiene was placed in the reactor first followed by toluene and the reactor was evacuated then pressured with nitrogen to about 25 psig. Diethylaluminum chloride and molybdenum trichloride distearate were added as a preformed catalyst. The reaction mixtures were agitated at the indicated temperature for the times shown in Table I. At the end of the reaction period, each mixture was charged with a 10 weight per cent solution of an antioxidant, 2,2'-methylene-bis(4-methyl-6-tert-butylphenol) in an equivolume mixture of isopropyl alcohol and toluene, with the amount added being sufficient to provide about one part by weight of the antioxidant per 100 parts of polybutadiene. Each mixture was then coagulated in isopropyl alcohol and the polymer separated and dried.

EXAMPLE II

Butadiene was polymerized employing the same polymerization recipe of Example I. The polymerization mixture (unterminated) was treated according to the recipe shown below.

| Reaction Recipe | |
|---|---|
| Diethylaluminum chloride | 4.40 mhm |
| Molybdenum trichloride distearate | 2.90 mhm |
| Ratio, Al/Mo | 1.5/1 |
| Temperature, ° C | 70 |
| Time, hours | 0.75 |

The modification reaction mixture was then terminated as in Example I. The mixture was steam stripped and the product washed with dilute mineral acid then dried by evaporation of water and remaining diluent. The dried product was gel-free with an inherent viscosity of 0.09.

EXAMPLE III

Butadiene was polymerized using the recipe shown below. The charging procedure was the same as that employed in Example I. The unterminated polymerization reaction mixture was treated according to the recipe employed in Example II and the product isolated as in Example II. The dried product was gel-free with an inherent viscosity of 0.21 and 99% unsaturation.

| Polymerization Recipe | Parts, by weight |
|---|---|
| Cyclohexane | 760 |
| 1,3-Butadiene | 100 |
| n-Butyllithium | 0.90 mhm |
| Temperature, ° C | 70 |
| Time, hours | 1.67 |

EXAMPLE IV

A polyisoprene prepared with an organolithium initiator was treated according to this invention employing the recipe shown below.

| Reaction Recipe | Parts, by weight |
|---|---|
| Polyisoprene[a] | 100 |
| Toluene | 1720 |
| Diethylaluminum chloride (DEAC) | Variable |
| Molybdenum trichloride distearate | 2.90 mhm |
| Temperature, ° C | 70 |
| Time, hours | Variable |

[a] Gel-free; inherent viscosity 8.05; 85% cis-1,4-addition; 5.2% 3,4-addition.

In each of these runs the polyisoprene was added to the reactor first followed by toluene. The reactor was evacuated then pressured to about 25 psig with nitrogen. Diethylaluminum chloride was added next followed by the molybdenum trichloride distearate. Each mixture was agitated at 70° C for the desired length of time after which each mixture was terminated and the products isolated as in Example I. The results obtained in these runs are shown in Table II.

TABLE II

| Run No. | DEAC mhm | Ratio Al/Mo | Time, Hours | Inherent Viscosity | Gel % | Unsaturation % Cis | % 3.4 | Total |
|---|---|---|---|---|---|---|---|---|
| 1[a] | — | — | — | 8.05 | 0 | 85 | 5.2 | 98.7 |
| 2 | 6.6 | 2.3/1 | 0.75 | 1.42 | 0 | 80 | 4.9 | 94.3 |
| 3 | 4.4 | 1.5/1 | 2.0 | 3.43 | 0 | 70 | 4.3 | 92.1 |

[a] Base polymer

The above runs demonstrated the reduction in molecular weight obtained by the process of the invention. Of particular interest are the unsaturation values obtained for the treated polymers. Note that although molecular weight is significantly decreased, the unsaturation in the polymer is not altered significantly.

The results shown in the above examples I-IV demonstrate the polymers of conjugated dienes are easily converted to lower molecular weight products that are gel-free and contain essentially the same amount and type of unsaturation as the higher molecular weight starting polymers.

EXAMPLE V

According to one embodiment of this invention, cyclopentene was polymerized in a series of runs with a catalyst of this invention for varying lengths of time to demonstrate the breakdown of the unsaturated polymer thus produced. The polymerization recipe employed in this series of runs is shown below.

| Polymerization Recipe | |
|---|---|
| | Parts, by weight |
| Toluene | 435 |
| Cyclopentene | 100 |
| Molybdenum trichloride distearate | 3 mhm[a] |
| Diethylaluminum chloride | 4.5 mhm[a] |
| Ratio, Al/Mo | 1.5/1 |
| Temperature, °C | 5 |
| Time, hours | Variable |

[a]mhm = gram millimoles per 100 grams of monomer (cyclopentene).

In each of these runs, toluene was charged to the reactor first followed by a nitrogen purge. The reactor was closed, flushed with argon, and then pressured to about 20 psig with argon. The molybdenum trichloride distearate was charged next as a 0.3 M solution in cyclohexane. The reactor contents were cooled to about 0° C and then cyclopentene and diethylaluminum chloride were charged and the reaction mixture agitated at 5° C for the desired reaction period. At the end of each reaction period, each mixture was charged with a 10 weight per cent solution of 2,2'-methylene-bis(4-methyl-6-tert-butylphenol) in isopropyl alcohol, the amount charged being sufficient to provide one part by weight of antioxidant per 100 parts by weight of cyclopentene charged to the polymerization. Each terminated reaction mixture was diluted with added toluene and then coagulated with isopropyl alcohol. The recovered polymer from each run was separated and dried. The results obtained in this series of runs are shown in Table III.

TABLE III

| Run No. | Time, Hours | Conversion, Per Cent | Inherent[a] Viscosity | Gel,[a] Per Cent |
|---|---|---|---|---|
| 1 | 0.10 | 6 | 3.78 | 0 |
| 2 | 0.50 | 23 | 4.06 | 0 |
| 3 | 1.0 | 45 | 3.82 | 0 |
| 4 | 2.0 | 56 | 3.67 | 0 |
| 5 | 4.0 | 67 | 3.33 | 0 |
| 6 | 23.5 | 69 | 2.21 | 0 |

[a]Determined according to the procedure of U.S. 3,278,508, Col. 20, notes a & b.

The results of Table III show clearly that the inherent viscosity passes through a maximum with time and that further the inherent viscosity decreases while the conversion increases after the maximum inherent viscosity has been reached. The observed decrease in inherent viscosity is a clear indication of the polymer breakdown according to this invention.

EXAMPLE VI

In another series of runs, an unsaturated polymer of cyclopentene previously prepared was dissolved in toluene and treated with a catalyst of this invention at various temperatures. The polymerization recipe employed to prepare the polymer is shown below.

| Polymerization Recipe | |
|---|---|
| | Parts, by weight |
| Toluene | 435 |
| Cyclopentene | 100 |
| Molybdenum trichloride distearate | 5.5 mhm |
| Diethylaluminum chloride | 11.0 mhm |
| Temperature, °C | 5 |
| Time, hours | 22 |

In this run the charging and recovery procedures were the same as those employed in Example V. The polymer thus prepared was dissolved in toluene and reacted with a catalyst of this invention as shown in the recipe below.

| Modification Reaction Recipe | |
|---|---|
| | Amount |
| Toluene | 50 ml. |
| Polymer | 5.0 g. |
| Molybdenum trichloride distearate | Variable |
| Diethylaluminum chloride | Variable |
| Temperature, °C | Variable |
| Time, hours | 24 |

In each of these runs, toluene was charged to the reactor first followed by a nitrogen purge. The polymer was added next and the reactor closed, flushed with argon, and then pressured to about 20 psig argon. The reactor contents for each run were agitated at 30° C for 16 hours. The reaction mixtures of runs 1, 2, and 3 were cooled to 0° C while the mixture of run 4 was cooled to about 25° C. Next, the molybdenum trichloride distearate (0.3 M in cyclohexane) was added to each mixture followed by the diethylaluminum chloride. The mixtures were then agitated at the desired temperature for the desired reaction period. Each reaction mixture was terminated and the polymer recovered as described in Example V. The results obtained in this series of runs are shown in Table IV.

TABLE IV

| Run No. | Temperature °C | MoCl$_3$(stearate)$_2$ mmole | Et$_2$AlCl mmole | Ratio Al/Mo | Inherent Viscosity | Gel % |
|---|---|---|---|---|---|---|
| 1[a] | — | — | — | — | 2.67 | 0 |
| 2[b] | 5 | — | — | — | 2.67 | 0 |
| 3 | −40 | 0.6 | 0.9 | 1.5/1 | 2.43 | 0 |
| 4 | 5 | 0.6 | 0.9 | 1.5/1 | 1.31 | 0 |
| 5 | 30 | 0.6 | 0.9 | 1.5/1 | 0.56 | 0 |

[a]Base polymer untreated according to the recipe shown.
[b]Control run.

The results in Table IV demonstrate that the modification reaction of this invention can occur at low temperatures and can be markedly accelerated by an increase in the temperature of reaction. It should also be noted that the products obtained after the modification reaction in Examples V and VI are gel-free.

EXAMPLE VII

Polybutadienes were treated with an ethylaluminum sesquichloride/molybdenum trichloride dioctanoate catalyst according to the invention to demonstrate the modification of said polybutadienes. The polybutadienes employed in this series of runs were prepared according to the polymerization recipe shown below.

| Polymerization Recipe | |
|---|---|
| | Parts, by weight |
| Butadiene | 100 |
| Cyclohexane | 800 |

-continued

| Polymerization Recipe | |
|---|---|
| | Parts, by weight |
| n-Butyllithium | 0.064(1.0 mmole) |
| Temperature, °F | 158 |
| Time, hours | 2 |

In these runs, cyclohexane was charged to the reactor first followed by nitrogen purge. Butadiene was added next followed by n-butyllithium and the mixture was then agitated at 158° F throughout the polymerization reaction.

The polybutadienes prepared as described above were treated according to the invention employing the recipe shown below. The recipe and the results of these runs are shown in Table V.

TABLE V

| | Parts, by weight |
|---|---|
| Polybutadiene | 100 |
| Cyclohexane | 800 |
| Ethylaluminum sesquichloride | Variable |
| Molybdenum trichloride di-octanoate | (1.0 mmole) |
| Temperature, °F | 158 |
| Time, hours | 1 |

| Run No. | $Et_3Al_2Cl_3$ Mmoles | Ratio Al/Mo | Inherent Viscosity | Cold Flow[b] Mg/Min |
|---|---|---|---|---|
| 1 Control[a] | — | — | 1.67 | 74 |
| 2 | 0.5 | 1.0/1; | 0.42 | Too high to measure |
| 3 | 1.0 | 2.0/1 | 0.80 | 1740 |
| 4 | 1.5 | 3.0/1 | 1.49 | 35 |
| 5 | 2.0 | 4.0/1 | 1.76 | 3.6 |
| 6 | 4.0 | 8.0/1 | 1.75 | 1.7 |

[a]Untreated polybutadiene
[b]Measured by extruding the rubber through a 1/4-inch orifice at 3.5 psi pressure at 50° C (122° F). After allowing 10 minutes to reach a steady state, the rate of extrusion is measured and reported in milligrams per minute.

In these runs, the unquenched polybutadiene in cyclohexane was placed in the reactor which was then evacuated and then pressurized with nitrogen to about 25 psig. Ethylaluminum sesquichloride was added followed by the addition of the molybdenum trichloride dioctanoate. The reaction mixtures were agitated at 158° F for one hour. At the end of the reaction period, each mixture was charged with a 10 wt. % solution of an antioxidant, 2,2'-methylene-bis(4-methyl-6-tert-butylphenol) in an equivolume mixture of isopropyl alcohol and cyclohexane, with the amount added being sufficient to provide about 1 part by weight of the antioxidant per 100 parts of polybutadiene. Each mixture was then coagulated in isopropyl alcohol and the polymer separated and dried.

The above runs clearly demonstrate the reduction in inherent viscosity which is obtained using the process of the invention. In particular, it should be noted that even where a relatively low inherent viscosity polybutadiene (i.e., 1.67 I.V.) is employed, dramatic reduction in inherent viscosity can be obtained when the molar ratio of the organometallic component to the transition metal is in the range of 0.1 to about 1.5. At mol ratios of from about 1.5 to 4.0, a superimposed branching effect is observed, increasing molecular weight and decreasing cold flow.

We claim:

1. The process of decreasing the molecular weight of a polymer wherein said polymer is a polymer of a cyclomonoolefin, wherein said process comprises contacting said polymer with an effective amount of a homogeneous olefin disproportionation catalyst under contacting conditions of temperature and pressure at which said disproportionation catalyst is active for the olefin reaction, whereby the molecular weight of said polymer is decreased, wherein said homogeneous catalyst comprises (a) a transition metal compound and (b) an organometallic compound in a ratio of said (b):(a) effective to decrease said molecular weight, wherein said (a) transition metal compound is represented by the formula $(L_aM_cZ_d)_x$ wherein each L represents an organic or inorganic ligand; M is molybdenum, tungsten, rhenium, ruthenium or rhodium; Z is a halide, —CN, —SCN, —OCN, or —$SnCl_3$ radical; $a$ and $d$ each represent a number 1 to 5, $c$ represents a number 1 to 4; $x$ represents a number indicative of the polymeric state of the compound; and wherein at least one of L and Z is present in said $(L_aM_cZ_d)_x$, and wherein said (b) organometallic adjuvant comprises (1) $R_eAlX_f$, (2) a mixture of compounds of (1), (3) a mixture of one or more of $AlX_3$ or $R_eAlX_f$ compounds with one or more compounds represented by the formula $R_g^1M^1X_h$, (4) $R_gM^1Y_h$ compound, (5) $AlX_3$ compound, or (6) $M^1M^2H_j$, wherein each R is an aromatic or saturated aliphatic hydrocarbon radical having up to 20 carbon atoms including alkoxy and halo derivatives thereof, wherein each X is halogen, Y is halogen or hydrogen, each $M^1$ is a metal of Group IA, IIA, IIB, or IIIA, except Al, each $M^2$ is a metal of Group IA, IIA, IIB, or IIIA; $e$ represents a number of 1 to 3, $f$ represents a number of 0 to 2, such that the sum of $e$ and $f$ equals 3; $g$ represents a number of 1 to 3, $h$ represents a number of from 0 to 2, such that the sum of $g$ and $h$ is equal to the valence of $M^1$, $j$ is an integer equal to the sum of the valences of $M^1$ and $M^2$.

2. The process of claim 1 wherein in said homogeneous disproportionation catalyst transition metal compound $[(L)_aM_cZ_d]_x$ said (L) is an inorganic or organic ligand.

3. The process of claim 1 wherein said (L) ligand is $R_3Q$, $R_3QO$, $R_2Q$—$QR_2$, $R_2NR^1$, O, S, CO, $R_2N$—$R^2$—$NR_2$, R—S—R, $R^3S$, $[\pi$—$(CHR^4\!=\!CR^4\!=\!CH_2)]$, $R^5(CN)_k$, $R^5O$—, $R^5(COO$—$)_k$, $RCOR^6(COO$—$)_k$, $[(RCO)_2CH$—$]$, $(R_2NCSS$—$)$, unsubstituted and $R^5$ group-substituted pyridine, unsubstituted and $R^5$ group-substituted bipyridine, or unsubstituted and R group-substituted cyclopentadienyl radicals wherein said R is an aromatic or saturated aliphatic radical having up to 20 carbon atoms and can be substituted with halo or alkoxy group; $R^1$ is hydrogen or R; $R^2$ is a divalent R radical; $R^3$ is a divalent saturated aliphatic or ethylenically unsaturated aliphatic radical of from 4 to 10 carbon atoms; $R^4$ is hydrogen or methyl; $R^5$ is aromatic, saturated aliphatic, or ethylenically unsaturated aliphatic radical of up to 30 carbon atoms; $R^6$ is a divalent saturated aliphatic radical of from 1 to 10 carbon atoms; Q is phosphorus, arsenic, or antimony; and k represents a number which is 1 or 2.

4. The process of claim 1 wherein said (a) is molybdenum trichloride distearate or molybdenum trichloride dioctanoate, and said (b) is diethylaluminum chloride or ethylaluminum sesquichloride.

5. The process according to claim 1 wherein said contacting is conducted at a temperature in the range of about 50° to 250° F. employing a pressure in the range of about 1 to 100 atmospheres, wherein is employed about 0.15 to 150 gram millimoles of said homogeneous catalyst per 100 grams of said polymer.

6. The process according to claim 1 wherein said contacting is conducted in the presence of a diluent, said diluent is a hydrocarbon diluent, and said polymer is contacted in the form of a solution of said polymer and said diluent.

7. The process according to claim 1 wherein the mole ratio of said (b) to said (a) is in the range of at least about 1.5:1.

8. The process of claim 7 wherein said polymer has an initial weight-average molecular weight in the range of from about 10,000 to 500,000 and an average of about 0.25 to 1 internal double bonds per monomer unit incorporated into the polymer.

9. The process according to claim 8 wherein said polymer is polybutadiene, and wherein the ratio of (b):(a) is in the range of about 1.5 to 4.

10. The process according to claim 8 wherein said polymer is polyisoprene, and said olefin disproportionation catalyst employs a mole ratio of (b):(a) of at least about 2.5:1.

11. The process according to claim 8 wherein said polymer is a homopolymer of 1,3-butadiene, and said homogeneous catalyst comprises (a) molybdenum trichloride distearate and (b) diethylaluminum chloride.

12. The process of claim 3 wherein said (L) ligand is $R_3Q$, $R_3QO$, $R_2Q-QR_2$, $R_2NR^1$, $R_2N-R^2-NR_2$, $R-S-R$, $R^3S$, $[\pi-(CHR^4=CR^4=CH_2)]$, $R^5(CN)_k$, $R^5O-$, $R^5(COO-)_k$, $RCOR^6(COO-)_k$, $[(RCO)_2-CH-]$, $(R_2NCSS-)$, unsubstituted and $R^5$ group-substituted pyridine, unsubstituted and $R^5$ group-substituted bipyridine, or unsubstituted and R group-substituted cyclopentadienyl radicals wherein said R is an aromatic or saturated aliphatic radical having up to 20 carbon atoms and can be substituted with halo or alkoxy group; $R^1$ is hydrogen or R; $R^2$ is a divalent R radical; $R^3$ is a divalent saturated aliphatic or ethylenically unsaturated aliphatic radical of from 4 to 10 carbon atoms; $R^4$ is hydrogen or methyl; $R^5$ is aromatic, saturated aliphatic, or ethylenically unsaturated aliphatic radical of up to 30 carbon atoms; $R^6$ is a divalent saturated aliphatic radical of from 1 to 10 carbon atoms; Q is phosphorus, arsenic, or antimony; and k represents a number which is 1 or 2.

13. The process of modifying the properties of a polymer by effecting a decrease in molecular weight or inherent viscosity wherein said polymer is characterized by a carbon backbone with internal unsaturation in the polymer carbon backbone and an initial weight average molecular weight of at least about 1000 as determined by light scattering, wherein said process comprises contacting said polymer with an olefin disproportionation catalyst comprising a homogeneous catalyst under contacting conditions of temperature and pressure at which said olefin disproportionation catalyst is active for the olefin reaction, for a time sufficient to effectuate said modification, wherein said homogeneous catalyst comprises (a) a transition metal compound, and (b) an organometallic compound, wherein said (a) is represented by the formula $[(L)_aM_cZ_d]_x$ wherein each (L) represents an inorganic ligand; M is molybdenum, tungsten, rhenium, ruthenium, or rhodium; Z is a halide, CN, SCN, OCN, or $SnCl_3$ radical; $a$ and $d$ each represent a number 1 to 5; $c$ represents a number 1 to 4; and $x$ represents a number indicative of the polymeric state of the compound;

wherein said (b) component of said homogeneous catalyst is an organometallic adjuvant comprising (1) $R_eAlX_f$, (2) a mixture of compounds of (1), (3) a mixture of one or more of $AlX_3$ or $R_eAlX_f$ compounds with one or more compounds represented by the formula $R_g^1M^1X_h$, (4) $R_gM^1Y_h$ compound, (5) $AlX_3$ compound, or (6) $M^1M^2H_j$, wherein each R is an aromatic or saturated aliphatic hydrocarbon radical having up to 20 carbon atoms including alkoxy and halo derivatives thereof, wherein each X is halogen, Y is halogen or hydrogen, each $M^1$ is a metal of Group IA, IIA, IIB, or IIIA, except Al, each $M^2$ is a metal of Group IA, IIA, IIB, or IIIA; $e$ represents a number 1 to 3, $f$ represents a number 0 to 2, such that the sum of $e$ and $f$ equals 3; $g$ represents a number 1 to 3, $h$ represents a number 0 to 2, such that the sum of $g$ and $h$ is equal to the valence of $M^1$, $j$ is an integer equal to the sum of the valences of $M^1$ and $M^2$.

14. The process of claim 13 wherein said polymer is characterized by an initial weight-average molecular weight of at least about 1000 up to about 10,000,000, wherein said process comprises contacting said polymer in the form of a solution with an olefin disproportionation catalyst comprising said homogeneous catalyst, wherein said contacting employs about 0.15 to 150 gram millimoles of said catalyst per 100 grams of polymer, said contacting is conducted at a temperature of about 50° to 250° F. employing a pressure in the range of about 1 to 100 atmospheres effective for said modifying.

15. The process of claim 14 wherein said polymer is polybutadiene, and wherein said homogeneous catalyst comprises (a) molybdenum trichloride distearate and (b) diethylaluminum chloride in the ratio (b) to said (a) effective to reduce the molecular weight of said polymer.

16. The process of claim 13 wherein said (L) inorganic ligand is O, S, or CO.

17. The process according to claim 13 wherein said catalyst is said homogeneous catalyst wherein the mole ratio of said (b) to said (a) is in the range of about 1.5:1 or less.

18. The process of claim 13 wherein said polymer has an initial weight-average molecular weight in the range of from about 10,000 to 500,000 and an average of about 0.25 to 1 internal double bonds per monomer unit incorporated into the polymer.

19. The process of claim 13 wherein said polymer is a polymer of a conjugated diene, a copolymer of two or more conjugated dienes, or a copolymer of a conjugated diene and a vinyl monomer, wherein the conjugated diene has 4 to 12 carbon atoms per molecule, or a polymer of a cyclic monoolefin.

20. The process according to claim 13 wherein said polymer is polyisoprene, and said homogeneous catalyst employs a mole ratio of (b):(a) of about 2.5:1 or less.

21. The process of claim 13 wherein said polymer is contacted with said homogeneous catalyst which comprises (a) molybdenum trichloride distearate and (b) diethylaluminum chloride.

22. The process of modifying the properties of a polymer of a cyclic monoolefin by effecting a reduction in the molecular weight of said polymer, wherein said polymer is characterized by a carbon backbone with internal unsaturation in the polymer carbon backbone and an initial weight average molecular weight of at least about 1000 as determined by light scattering, wherein said process comprises contacting said polymer with an olefin disproportionation catalyst comprising a homogeneous catalyst under contacting conditions of temperature and pressure at which said olefin disproportionation catalyst is active for the olefin reaction, for a time sufficient to effectuate said modification, wherein said homogeneous olefin disproportionation catalyst comprises an effective ratio of (a) a transition metal compound represented by the formula $(L_aM_cZ_d)_x$ wherein each L represents a ligand; M is a metal of Group IB, IIIB, IVB, VB, VIB, VIIB, or the iron and cobalt subgroups of Group VIII; Z is a halide, CN, SCN, OCN, or $SnCl_3$, $a$ and $b$ are numbers 0 to 6, $c$ is 1 to 4, and $x$ is a number indicative of the polymeric state of the compound; such that at least one of L or Z is present; and wherein said organometallic adjuvant (b) component of said homogeneous catalyst comprises (1) $R_eAlX_f$, (2) a mixture of compounds of (1), (3) a mixture of one or more of $AlX_3$ or $R_eAlX_f$ compounds with one or more compounds represented by the formula $R_g{}^1M^1X_h$, (4) $R_gM^1Y_h$ compound, (5) $AlX_3$ compound, or (6) $M^1M^2H_j$, wherein each R is an aromatic or saturated aliphatic hydrocarbon radical having up to 20 carbon atoms including alkoxy and halo derivatives thereof, wherein each X is halogen, Y is halogen or hydrogen, each $M^1$ is a metal of Group IA, IIA, IIB, or IIIA, except Al, each $M^2$ is a metal of Group IA, IIA, IIB, or IIIA; $e$ represents a number 1 to 3, $f$ represents a number 0 to 2, such that the sum of $e$ and $f$ equals 3; $g$ represents a number 1 to 3, $h$ represents a number 0 to 2, such that the sum of $g$ and $h$ is equal to the valence of $M^1$, $j$ is an integer equal to the sum of the valences of $M^1$ and $M^2$.

23. The process of claim 22 wherein said M is molybdenum, tungsten, rhenium, ruthenium, or rhodium; and (a) and (d) each represent a number of 1 to 5.

24. The process of claim 22 wherein in said $(L_aM_cZ_d)_x$ said M is molybdenum, tungsten, rhenium, ruthenium, or rhodium; and $a$ and $d$ each represent a number 1 to 5.

25. The process according to claim 23 wherein said contacting is conducted at a temperature in the range of about 50° to 250° F, said pressure is in the range of about 1 to 100 atmospheres, and wherein is employed about 0.15 to 150 gram millimoles of said homogeneous catalyst per 100 grams of said polymer, and said polymer has a molecular weight of up to about 10,000,000.

26. The process according to claim 25 wherein said contacting is conducted in the presence of a diluent, said diluent is a hydrocarbon diluent, and said polymer is contacted in the form of a solution of said polymer and said diluent.

27. The process of claim 23 wherein said (L) ligand is $R_3Q$, $R_3QO$, $R_2Q$—$QR_2$, $R_2NR^1$, O, S, CO, $R_2N$—$R^2$—$NR_2$, R—S—R, $R^3S$, [$\pi$-($CHR^4$=$CR^4$=$CH_2$)], $R^5(CN)_k$, $R^5O$—, $R^5(COO$—$)_k$, $RCOR^6(COO$—$)_k$, [$(RCO)_2CH$—], $(R_2NCSS$—), unsubstituted and $R^5$ group-substituted pyridine, unsubstituted and $R^5$ group-substituted bipyridine, or unsubstituted and R group-substituted cyclopentadienyl radicals wherein said R is an aromatic or saturated aliphatic radical having up to 20 carbon atoms and can be substituted with halo or alkoxy group; $R^1$ is hydrogen or R; $R^2$ is a divalent R radical; $R^3$ is a divalent saturated aliphatic or ethylenically unsaturated aliphatic radical of from 4 to 10 carbon atoms; $R^4$ is hydrogen or methyl; $R^5$ is an aromatic, saturated aliphatic, or ethylenically unsaturated aliphatic radical of up to 30 carbon atoms; $R^6$ is a divalent saturated aliphatic radical of from 1 to 10 carbon atoms; Q is phosphorus, arsenic, or antimony; and $k$ represents a number which is 1 or 2.

28. The process of claim 23 wherein said (L) ligand is $R_3Q$, $R_3QO$, $R_2Q$—$QR_2$, $R_2NR^1$, $R_2N$—$R^2$—$NR_2$, R—S—R, $R^3S$, [$\pi$—($CHR^4$=$CR^4$=$CH_2$)], $R^5(CN)_k$, $R^5O$—, $R^5(COO$—$)_k$, $RCOR^6(COO$—$)_k$, [$(RCO)_2CH$—], $(R_2NCSS$—), unsubstituted and $R^5$ group-substituted pyridine, unsubstituted and $R^5$ group-substituted bipyridine, or unsubstituted and R group-substituted cyclopentadienyl radicals, wherein said R is an aromatic or saturated aliphatic radical having up to 20 carbon atoms and can be substituted with halo or alkoxy group; $R^1$ is hydrogen or R; $R^2$ is a divalent R radical; $R^3$ is a divalent saturated aliphatic or ethylenically unsaturated aliphatic radical of 4 to 10 carbon atoms; $R^4$ is hydrogen or methyl; $R^5$ is aromatic, saturated aliphatic, or ethylenically unsaturated aliphatic radical of up to 30 carbon atoms; $R^6$ is a divalent saturated aliphatic radical of 1 to 10 carbon atoms; Q is phosphorus, arsenic, or antimony; and $k$ represents a number which is 1 or 2.

29. The process of claim 28 wherein said (L) ligand is said $R_2NR^1$, $R_2N$—$R^2$—$NR_2$, R—S—R, $R^3S$, [$\pi$—($CHR^4$=$CH^4$=$CH_2$)], $R^5(CN)_k$, $R^5O$—, $R^5(COO$—$)_k$, $RCOR^6(COO$—$)_k$, [$(RCO)_2CH$—], $(R_2NCSS$—), unsubstituted and R group-substituted pyridine, unsubstituted and $R^5$ group-substituted bipyridine, or unsubstituted and R group-substituted cyclopentadienyl radicals.

30. The process of claim 22 wherein said M is molybdenum, tungsten, rhenium, ruthenium, or rhodium; $a$ and $d$ each represent a number of 1 to 5.

31. The process of claim 22 wherein said M is a metal of Group VIB, VIIB, or the iron and cobalt subgroups of Group VIII.

32. A process for treating polymers of cyclomonoolefins characterized by having internal unsaturation in the polymer backbone and having an initial weight average molecular weight of about 1,000 to about 10,000,000 as determined by light scattering, said process comprising contacting said polymer of cyclomonoolefin with a homogeneous olefin disproportionation catalyst, under contacting conditions of temperature and pressure at which said olefin disproportionation catalyst is active for the olefin reaction, wherein said contacting of said polymer with said catalyst results in the generation of cyclomonoolefin monomer, wherein said homogeneous olefin disproportionation catalyst comprises (a) a transition metal compound and (b) an organometallic compound wherein the molar ratio of (b) to (a) is about 0.1:1 to about 10:1, and wherein said (a) transition metal compound is represented by the formula $(L_aM_cZ_d)_x$ wherein each L is an organic or inorganic ligand; M is a transition metal of Group IB, IIIB, IVB, VB, VIB, VIIB, or the iron and cobalt subgroups of Group VIII; Z is halide, CN, SCN, OCN, or $SnCl_3$; $a$ and $b$ are numbers 0 to 6, $c$ is 1 to 4, and $x$ is a number indicative of the polymeric state of the compound; such that at least one L or Z is present; and said (b) component is (1) $R_eAlX_f$, (2) a mixture of compounds of (1), (3) a mixture of one or more of $AlX_3$ or $R_eAlX_f$ compounds with one or more compounds having the formula $R_g{}^1M^1X_h$, (4) an $R_gM^1Y_h$ compounds, (5) an $AlX_3$ compound, or (6) $M^1M^2H_j$ wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is a halogen; Y is halogen or hydrogen; each $M^1$ is a metal of Group IA, IIA, IIB or IIIA, except Al, and each $M^2$ is a metal of Group IA, IIA, IIB or IIIA; e is 1, 2, or 3, f is 0, 1 or 2, the sum of e and f being 3; g is 1, 2 or 3, h is 0, 1 or 2, the sum of g and h being equal to the valence of $M^1$, j is an integer such that it is equal to the sum of the valences of $M^1$ and $M^2$.

33. The process of claim 32 wherein said polymer is a polymer of cyclopentene, cycloheptene, cyclooctene, cyclononene, or cyclodecene.

34. The process of claim 33 wherein said polymer of cyclomonoolefin is a polymer of cyclopentene, and said cyclomonoolefin monomer is cyclopentene.

35. The process of claim 23 wherein said (L) is said $R^5(COO-)_k$, and Z is said halide.

36. The process according to claim 35 wherein said (L) is stearate, Z is chloride, and M is molybdenum.

37. The process of increasing the molecular weight of a polymer, wherein said polymer is characterized by a carbon backbone with internal unsaturation in the polymer carbon backbone and an initial weight average molecular weight of at least about 1000 as determined by light scattering, wherein said process comprises contacting said polymer with an effective amount of a homogeneous olefin disproportionation catalyst under contacting conditions of temperature and pressure at which said disproportionation catalyst is active for the olefin reaction, whereby the molecular weight of said polymer is increased, wherein said homogeneous catalyst comprises (a) a transition metal compound and (b) an organometallic compound in a ratio of said (b):(a) effective to increase said molecular weight, wherein said (a) transition metal compound is represented by the formula $[(L)_aM_cZ_d]_x$ wherein (L) represents a ligand; M is molybdenum, tungsten, rhenium, ruthenium or rhodium; Z is a halide, —CN, —SCN, —OCN, or —SnCl$_3$ radical; a and d each represent a number 1 to 5; c represents a number 1 to 4; x represents a number indicative of the polymeric state of the compound; and wherein at least one of (L) and Z is present in said $[(L)_aM_cZ_d]_x$, and wherein said (b) organometallic component comprises (1) $R_eAlX_f$, (2) a mixture of compounds of (1), (3) a mixture of one or more of AlX$_3$ or $R_eAlX_f$ compounds with one or more compounds represented by the formula $R_g^1M^1X_h$, (4) $R_gM^1Y_h$ compound, (5) AlX$_3$ compound, or (6) $M^1M^2H_j$; wherein R is an aromatic or saturated aliphatic hydrocarbon radical having up to 20 carbon atoms including alkoxy and halo derivatives thereof; X is halogen; Y is halogen or hydrogen; $M^1$ is a metal of Group IA, IIA, IIB, or IIIA, except Al; $M^2$ is a metal of Group IA, IIA, IIB, or IIIA; e represents a number 1 to 3, and f represents a number 0 to 2, such that the sum of e and f equals 3; g represents a number 1 to 3, and h represents a number 0 to 2, such that the sum of g and h is equal to the valence of $M^1$; and j is an integer equal to the sum of the valences of $M^1$ and $M^2$.

38. The process of claim 37 wherein said (b) organometallic adjuvant comprises (1) $R_eAlX_f$, (2) a mixture of compounds of (1), (3) a mixture of one or more of AlX$_3$ or $R_eAlX_f$ compounds with one or more compounds represented by the formula $R_g^1M^1X_h$, (4) $R_gM^1Y_h$ compound, (5) AlX$_3$ compound, or (6) $M^1M^2H_j$, wherein each R is an aromatic or saturated aliphatic hydrocarbon radical having up to 20 carbon atoms including alkoxy and halo derivatives thereof, wherein each X is halogen, Y is halogen or hydrogen, each $M^1$ is a metal of Group IA, IIA, IIB, or IIIA, except Al, each $M^2$ is a metal of Group IA, IIA, IIB, or IIIA; e represents a number of 1 to 3, f represents a number of 0 to 2, such that the sum of e and f equals 3; g represents a number of 1 to 3, h represents a number of from 0 to 2, such that the sum of g and h is equal to the valence of $M^1$, j is an integer equal to the sum of the valences of $M^1$ and $M^2$.

* * * * *